(No Model.)
I. W. MASON.
WAGON OR STOCK SCALE.
No. 355,942. Patented Jan. 11, 1887.
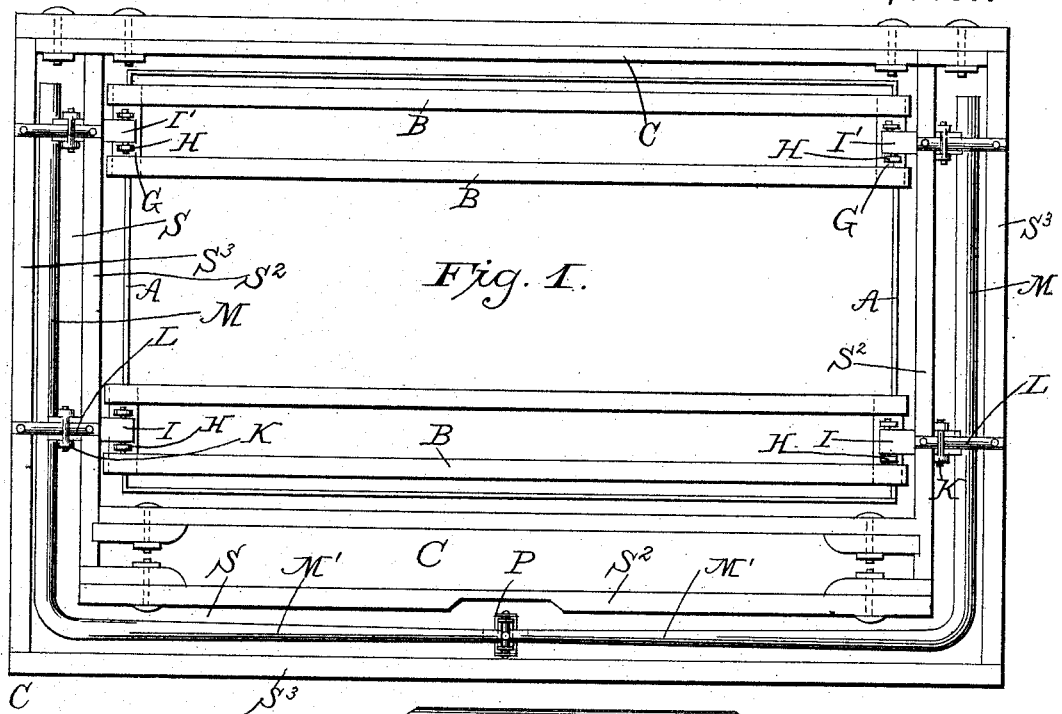
Fig. 1.
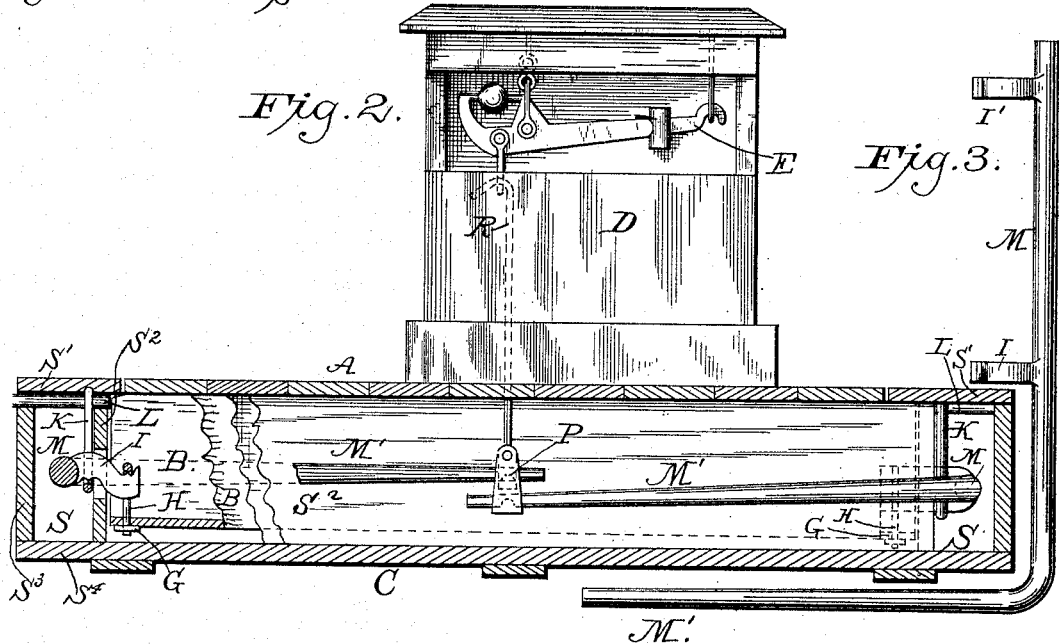
Fig. 2.
Fig. 3.
Witnesses
F. M. Burnham
A. P. O'Connor
Inventor
Isaac W. Mason
By his Attorney
Saml. J. Wallace

UNITED STATES PATENT OFFICE.

ISAAC W. MASON, OF BURNSIDE, ILLINOIS.

WAGON OR STOCK SCALE.

SPECIFICATION forming part of Letters Patent No. 355,942, dated January 11, 1887.

Application filed April 10, 1886. Serial No. 198,495. (No model.)

*To all whom it may concern:*

Be it known that I, ISAAC W. MASON, of Burnside, in the county of Hancock and State of Illinois, a citizen of the United States, have invented a new and Improved Wagon or Stock Scale, which is made, practiced, and used substantially as set forth hereinafter, and as shown in the accompanying drawings, in which—

Figure 1 is a plan view of the scale. Fig. 2 is an elevation showing the nature of the operative parts of the scale with portions broken away. Fig. 3 shows one of the levers M, with its arms I I' M'.

The object of this invention is to form an improved scale for weighing wagons and stock, adapted to be set on the surface of the ground, and to be easily removed from time to time, having the irons and working parts inclosed in box-spaces near the top of the platform, so as to be protected and accessible for examination and cleaning, having the foundation-frame made to form such box-space, and with the irons and parts made simple, strong, and well arranged in general.

To this end the invention consists in the several features hereinafter set forth and claimed.

The scale has a foundation-frame, C, adapted to rest upon the ground or suitable supports, and to inclose and support the weighing-platform A. This frame C is made hollow to form a box-space, S, at each end and one side of platform A, which space is separated from the space under the platform A by sills $S^2 S^3$, to inclose and protect the irons and weighing mechanism. This box-space has outer and inner sills, $S^2 S^3$, on each of the three sides of the platform, with floor $S^4$ and cover $S'$ attached to them to inclose it to protect from snow and dust drifting in to obstruct the mechanism. At one side a raised part, D, connects with this box-space for the elevated weighing-beam E.

The weighing-platform A is made of suitable size, with two frame-sills, B, at each side, and is hung within the foundation-frame. It is held by stirrups H from cross-bars G, under the ends of the sills B, as illustrated, which engage by suitable pivot-bearings with the ends of branch levers I I', projecting from the box-spaces S at each corner of the platform at the ends.

The weighing apparatus is formed of two peculiar bent and branched levers, M M', inclosed in box-spaces S at the ends and side of the platform, together with their supports, working pivots, and connections.

The levers M M' have each two branches, I I', arranged as shown, which are supported by stirrups K, having suitable pivot-bearings to connect with the levers. These stirrups are hung from cross-bars L between the tops of the side sills. The levers M M' extend across the ends of the scales supported on these pivot-bearings K', and act on them in weighing like rock-shafts. They are each bent at one end to form arms M M' in the box-space at the side of the scales, and extend to a double stirrup, P, therein, with which they engage by suitable pivot-bearings to support them arranged to counterbalance and support the platform and the load. The stirrups P are suspended by means of a rod, R, from the weighing-beam E, which is suitably arranged and provided with means for weighing.

The branch levers I I' have their pivot edges arranged a definite distance apart, and in a line arranged to be approximately horizontal in the act of weighing, so as to promote correctness therein. They project through openings in the inner sills, $S^2$, to support the platform. These openings connect with the spaces between the sills B under the platform, which also are protected by floors and covers, like spaces S, so that these ends of levers and stirrups are protected in a like way with the parts within the box-spaces S.

The box-space S on each side of the platform is provided with a cover, S', which is hinged or made readily removable to reach the inclosed mechanism for examination, cleaning, and repair.

I claim—

1. In a weighing-scale, the inclosed box S, having walls separating it from the space under the weighing-platform, combined with the levers M M' therein, the weighing-platform A, and arms supporting the said platform from said levers.

2. In a weighing-scale, the platform A, combined with sills $S^2$ $S^3$, surrounding it on three sides, and having the floor $S^4$ and the cover $S'$, and the weighing-levers M M', inclosed within the space between said sills, box-like, as described.

3. In a weighing-scale, the bent and branched levers M M' I I', combined with the stirrups K, the bars L, the stirrups H, the bars G, the said stirrups having pivot-bearings on the branch levers I I', the weighing-beam E, the rod R, and the stirrup P, pivoted on arms M'.

ISAAC W. MASON.

Witnesses:
R. E. AUSTIN,
H. C. MAYFIELD.